Aug. 8, 1961 D. C. LIVINGSTON 2,995,682

SWITCHING CIRCUIT FOR USE WITH ELECTROLUMINESCENT DISPLAY DEVICES

Filed Jan. 28, 1960

INVENTOR
DONALD C. LIVINGSTON
BY [signature]
ATTORNEY

United States Patent Office 2,995,682

Patented Aug. 8, 1961

2,995,682

SWITCHING CIRCUIT FOR USE WITH ELECTROLUMINESCENT DISPLAY DEVICES

Donald C. Livingston, Bayside, N.Y., assignor to Sylvania Electric Products Inc., a corporation of Delaware Filed Jan. 28, 1960, Ser. No. 5,214
11 Claims. (Cl. 315—169)

This invention relates to switching circuits and in particular to switching circuits for use with electroluminescent display devices.

One form of electroluminescent display device consists of an electroluminescent phosphor layer or film having first and second mutually orthogonal arrays of parallel, separated, electrical conductors positioned on each side thereof to form a crossed-grid structure. When a suitable voltage is applied between a selected conductor of the first array and a selected conductor of the second array, the portion of the electroluminescent layer located at the crossover point of the selected conductors is caused to glow. The degree of luminescence which this portion (defined as a cell) exhibits is dependent upon the magnitude and frequency of the applied voltage.

It has been found that if the applied voltage is switched in succession from cell to cell, then each cell will luminesce in turn producing an effect similar to that resulting from the scanning action developed in the cathode ray tube of a conventional television receiver. The apparatus required to perform this switching must be simple yet function rapidly and with a high degree of reliability.

Accordingly it is an object of the present invention to provide an improved switching circuit.

Another object is to provide an improved switching circuit which permits the successive, high-speed energization of a large number of electroluminescent cells or other devices.

Still another object is to provide an improved switching circuit which permits the selective energization of a plurality of electroluminescent cells in a sequence determined by an applied input signal.

In the present invention, a switching circuit is provided which is particularly adapted for use with a crossed-grid electroluminescent structure having spaced first and second arrays of parallel, separated, electrical conductors. These conductor arrays are generally perpendicular to each other, although the angle between them may have any value greater than zero degrees. A layer of electroluminescent material, placed between the two arrays of conductors, responds to the presence of a voltage between the conductors by emitting light in the areas subjected to the applied voltage.

Each of the conductors of the first array is coupled to one terminal of an alternating voltage source by a corresponding rectifying element, and each of the conductors of the second array is coupled by a corresponding rectifying element to the other terminal of the alternating voltage source. Alternating potential is applied to a conductor when the rectifying element connected to it is polarized to conduct in its forward direction. If a rectifier associated with a conductor of the first array and a rectifier associated with a conductor of the second array are both caused to conduct in their forward directions, alternating voltage will appear across the electroluminescent cell located at the crossover point between the two conductors, and it will luminesce.

The polarity of the voltage across a rectifying element determines whether it will be in its conducting or nonconducting state. One end of each rectifier is maintained at a positive direct potential while the other end is coupled to a control circuit comprising a plurality of switching elements and a lesser number of switching-element control devices. In one embodiment of the invention, the switching elements utilized are triode electron tubes and the switching-element control devices are magnetron beam switching tubes. The plates of one or more of the triodes are coupled to each of the electrical conductors, while the cathodes of the tubes are connected to a common reference point. The grid of each triode is connected to a target electrode of one of the beam switching tubes. Plate voltage for the triode tubes is supplied from a D.-C. source through load impedances coupled to each electrical conductor.

In the absence of a control signal, the triodes conduct, thereby lowering the potential on the positive terminals of the rectifying elements to a value below the potential applied to the negative terminals of the rectifying elements. The rectifying elements are thus normally reverse-biased, and substantially no voltage appears across the electroluminescent cells. When a control signal is supplied to a selected switching element of one of the beam switching tubes, the triode coupled to the target electrode associated with the selected switching element is cut off. The triode plate voltage rises, and the polarity of the voltage across the rectifying elements reverses, thereby permitting them to conduct in their forward direction and energize the associated conductor. It will be apparent that more than one triode may be connected to each conductor and that in this event all must be cut off before the rectifying element becomes conductive.

The above objects of the present invention and the brief introduction thereto will be more fully understood and further objects and advantages will become apparent from a study of the following detailed description in connection with the drawings wherein.

Figure 1:
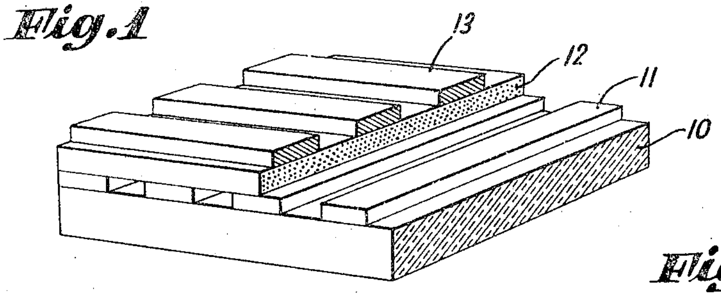
FIG. 1 is a section of a typical crossed-grid electroluminescent structure.

Referring to FIG. 1, there is shown a typical electroluminescent crossed-grid structure comprising a glass plate 10, a first array of horizontal, transparent, electrical conductors 11, an electroluminescent layer 12 and a second array of vertical electrical conductors 13. When a selected one of the horizontal conductors 11 and a selected one of the vertical conductors 13 are energized, an electric field is produced between them, causing the phosphor region, or cell, at the crossover point of the two conductors to luminesce. If voltages are applied to the conductors sequentially, a scanning action is obtained, the cells luminescing one after the other in a predetermined pattern.

Figure 2:
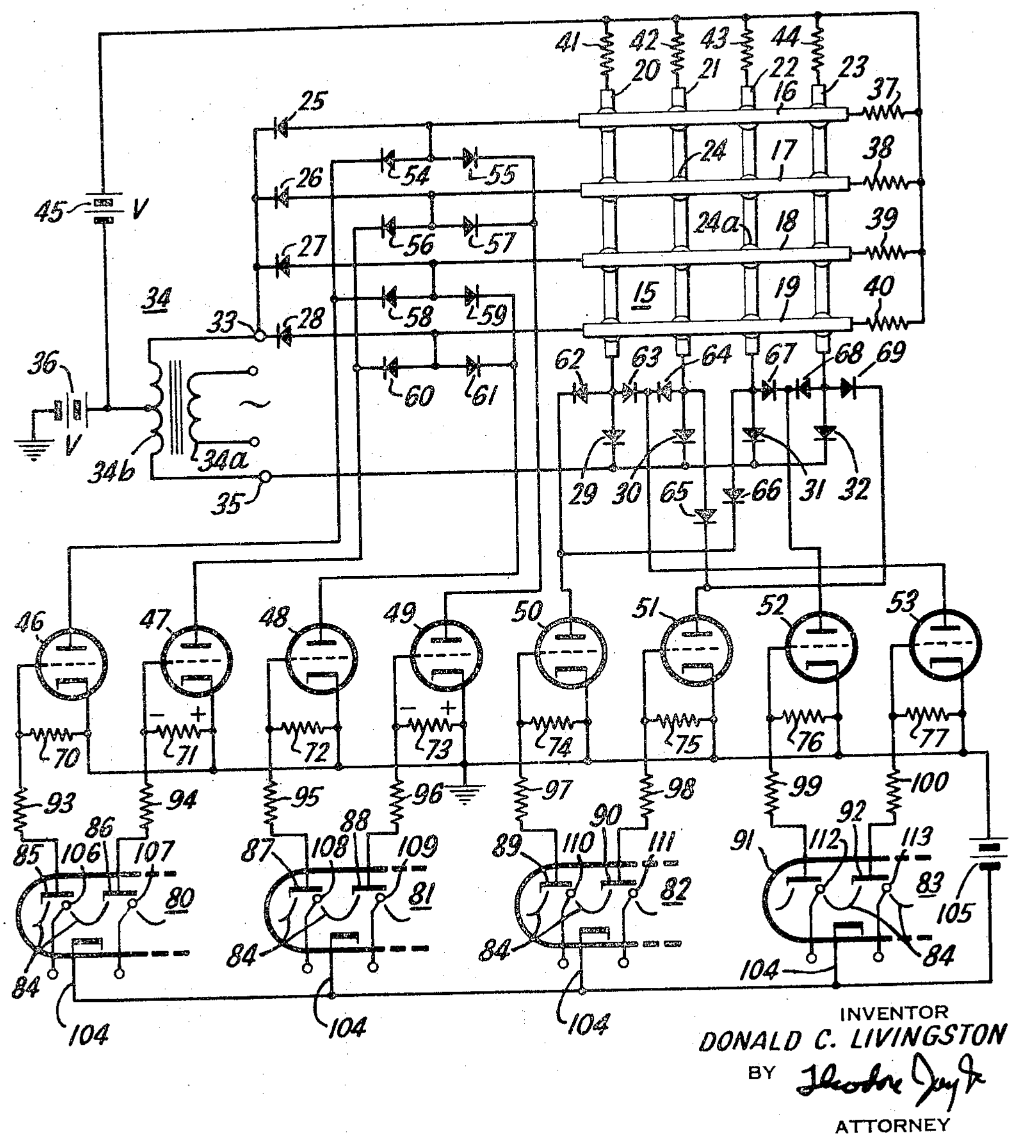
FIG. 2 is a schematic diagram of one form of the invention in which vacuum tubes are used in conjunction with beam switching tubes to control the voltages applied to a crossed-grid electroluminescent display device.

FIG. 2 is a schematic diagram of the switching apparatus of this invention used in conjunction with a crossed-grid electroluminescent panel 15 of the type depicted in FIG. 1. Panel 15 is shown schematically as consisting of four horizontal conductors 16, 17, 18, and 19 and four vertical conductors 20, 21, 22, and 23. Only four conductors are shown in each direction for simplicity, but it will be understood that in a practical structure one hundred or more conductors may be provided in each direction. A phosphor cell is shown graphically by a circle located at the intersection between each pair of conductors. Thus, phosphor cell 24 would be activated by energizing electrical conductors 21 and 17 by a suitable alternating voltage, and phosphor cell 24a would be achivated by similarly energizing conductors 18 and 22.

The positive terminals of a first set of rectifiers 25, 26, 27, and 28 are connected to the first array of electrical conductors 16–19, and a second set of rectifiers 29, 30, 31, and 32 are similarly connected to the second array of electrical conductors 20–23. The negative terminals of rectifiers 25–28 are coupled to a common terminal 33 of the secondary winding 34$b$ of transformer 34, while the negative terminals of rectifiers 29–32 are connected to terminal 35 of the transformer secondary winding. An alternating voltage is applied to the primary winding 34$a$ of transformer 34. A center tap on the secondary winding 34$b$ of transformer 34 is connected to ground through a D.-C. voltage source 36. Electrical conductors 16–23 are coupled by a set of resistors 37–44 and a D.-C. voltage source 45 to the junction of voltage source 36 and the center tap on secondary winding 34$b$. The magnitudes of voltage sources 36 and 45 are each equal to a value V, V being greater than the amplitude of the alternating voltage existing between the center tap of secondary winding 34$b$ and either end of the winding.

The polarity of the voltage across rectifiers 25–32 is determined by a control circuit comprising triodes 46–53 and beam switching tubes 80–83. In this circuit, the plate of triode 46 is connected to conductor 16 through an isolating rectifier 54, while the plate of triode 49 is connected to conductor 16 through an isolating rectifier 55. Similarly, conductor 17 is connected to triodes 47 and 49 through isolating rectifiers 56 and 57 respectively, conductor 18 is connected to triodes 46 and 48 through rectifiers 58 and 59, and conductor 19 is connected to triodes 47 and 48 through rectifiers 60 and 61. In the same way, conductor 20 is coupled to the plates of triodes 50 and 53 through rectifiers 62 and 63, conductor 21 is coupled to triodes 51 and 53 through rectifiers 64 and 65, conductor 22 is coupled to triodes 50 and 52 through rectifiers 66 and 67, and conductor 23 is coupled to triodes 51 and 52 through rectifiers 68 and 69. The cathodes of triodes 46–53 are grounded, and the grids of these tubes are also connected to ground through bias resistors 70–77.

Each of the grids of triodes 46–53 is coupled to a target electrode of one of the four beam switching tubes 80–83. These beam switching tubes may be similar to a tube known commercially as Burroughs type 6700 having ten target electrodes. In order to avoid complicating the drawing, only two target electrodes have been shown in each tube, although it will be understood that if a crossed-grid structure having one hundred horizontal and one hundred vertical electrodes were used, all ten target electrodes in each tube would be employed. Also, the voltage connections to the spade elements 84 have not been shown, and the tube has been depicted schematically instead of in its usual cylindrical form.

Target electrodes 85–92 are coupled through resistors 93–100 to the grids of tubes 46–53 respectively, while their cathodes 104 are connected to the negative terminal of a D.-C. voltage source 105. The positive terminal of voltage source 105 is connected to the grounded cathodes of the triode tubes.

In the absence of a control signal on the beam switching elements 106–113 of tubes 80–83, triodes 46–53 conduct, their plate voltages being supplied by series-connected voltage sources 36 and 45 through resistors 37–44. These tubes conduct heavily enough so that their plate voltages are less than V, the magnitude of the voltage applied to the negative terminals of rectifiers 25–32 by source 36. Thus, rectifiers 25–32 present high impedances, and no alternating voltage appears across the electroluminescent cells.

When a control pulse is applied to one of the beam switching elements 106–113, current flows between the cathode and the target electrode associated with the energized switching element. If a pulse is applied to a switching element immediately to the right of the energized element, the beam switches to the target electrode associated with this second switching element. Also, if control pulses are applied to adjacent switching elements in rapid succession, the beam will effectively switch directly from the first element energized to the last.

Thus, if suitable control voltages are applied to switching elements 106 and 108 of beam switching tubes 80 and 81, current will flow from the positive terminal of voltage source 105 through resistors 71 and 94 to the target electrode 86 of beam switching tube 80 and through resistors 73 and 96 to target electrode 88 of beam switching tube 81. The voltages produced across resistors 71 and 73 respectively, drive the grids of tubes 47 and 49 negative with respect to their cathodes, thereby cutting off the triodes. When triodes 47 and 49 cease conducting, their plates and therefore the junction of rectifiers 56 and 57 rise in potential to a value approximately equal to 2V since current no longer flows through resistor 38. Since the positive terminal of rectifier 26 is at a potential 2V and its negative terminal is at a potential V, rectifier 26 becomes conductive and the alternating voltage on terminal 33 of transformer 34 is applied to electrical conductor 17.

Similarly, the alternating voltage on terminal 35 of transformer 34 may be coupled to electrical conductor 21 by applying a suitable signal to switching elements 110 and 112 of beam switching tubes 82 and 83. The resulting current flow through these tubes will cause triodes 51 and 53 to be cut off in the same manner as described for triodes 46 and 49, thereby rendering rectifier 30 conductive. Terminal 33 is then effectively connected through rectifier 26 to electrical conductor 17 and terminal 35 through rectifier 30 to electrical conductor 21. The alternating voltage appearing across the ends of secondary winding 34$b$ of transformer 34 will therefore be impressed on the electroluminescent phosphor cell 24, causing it to luminesce.

It shall be noted that in the embodiment described, two triodes must be cut off in order to unblock any one of the rectifiers 25–32. If only one of these tubes has ceased to conduct, conduction through the other tube will still prevent the positive terminal of the rectifier from achieving a high enough potential to permit conduction. The use of two triodes to control each rectifier is advantageous in an electroluminescent display device having one hundred conductors in each array since only four beam switching tubes having ten target electrodes each are required to selectively energize the ten thousand electroluminescent cells comprising the crossed-grid display device. However, the number of triodes used in each control circuit may be varied, the optimum number being a function of the number of conductors in each array.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. An electroluminescent device comprising an electroluminescent cell having first and second terminals, first and second rectifying means coupled to said first and second terminals respectively, said first and second rectifying means being adapted to receive a first voltage therebetween, first and second impedance means coupled to said first and second terminals respectively, means adapted for coupling a second voltage between the ends of said first and second impedance means remote from said terminals and a common voltage reference point, and control means for varying the voltage on said first and second terminals in response to an applied signal.

2. Apparatus as defined in claim 1 wherein said control means includes first and second series-connected switching elements, the junction between said switching elements being connected to said common voltage reference point.

3. Apparatus as defined in claim 2, wherein said first and second series-connected switching elements comprise vacuum tubes each provided with bias circuit means, the voltage across said bias circuit means being determined by an applied signal.

4. An electroluminescent device comprising first and second spaced arrays of electrical conductors, the conductors in said first array passing over the conductors in said second array to form a plurality of crossover points, a plurality of electroluminescent cells located between said conductors at said crossover points, first and second rectifying means coupled to said first and second arrays of conductors respectively, said first and second rectifying means being adapted to receive a first voltage therebetween, first and second impedance means coupled to said first and second arrays of conductors respectively, means adapted for coupling a second voltage between the ends of said first and second impedance means remote from said conductors and a common voltage reference point, and control means coupled to said first and second arrays of conductors, said control means selectively rendering said first and second rectifying means conductive or nonconductive in response to an applied signal.

5. An electroluminescent device comprising first and second spaced arrays of electrical conductors, the conductors in said first array passing over the conductors in said second array to form a plurality of crossover points, an electroluminescent layer interposed between said first and second arrays of conductors, first and second sets of rectifiers, each of the rectifiers in said first set having one terminal connected to a corresponding conductor of said first array of electrical conductors and each of the rectifiers in said second set having one terminal connected to a corresponding conductor of said second array of electrical conductors, means adapted for coupling a first applied voltage between the other terminals of said first set of rectifiers and the other terminals of said second set of rectifiers, a plurality of load impedances, each of said impedances having one terminal connected to a corresponding conductor of said first and second arrays of electrical conductors and the other terminal adapted to receive a second applied voltage, a plurality of switching elements each having first, second and third terminals, the first terminal of each of said switching elements being coupled to a common voltage reference point, means coupling the second terminal of each of said switching elements to a corresponding electrical conductor, and switching element control means coupled to the third terminal of each of said switching elements.

6. Apparatus as defined in claim 5 wherein each of said switching elements comprises an electron tube, the first element of said tube being a cathode, the second element an anode, and the third element a grid.

7. Apparatus as defined in claim 5 wherein said switching element control means comprises a set of beam switching tubes each having a cathode adapted to receive an applied voltage and a plurality of anodes, and means coupling each of said anodes to the first and second terminals of a corresponding switching element.

8. Apparatus as defined in claim 5 wherein the means coupling the second terminal of each of said switching elements to a corresponding electrical conductor comprises a rectifier.

9. Switching apparatus comprising first and second electrical conductors, first and second rectifying means coupled to said first and second conductors respectively, said first and second rectifying means being adapted to receive a first applied voltage therebetween, first and second impedance means coupled to said first and second conductors respectively, said first and second impedance means being adapted to receive a second applied voltage, and control means connected across said first and second conductors, said control means varying the voltage on said first and second conductors in response to an applied signal.

10. An electroluminescent device comprising an electroluminescent cell having first and second terminals, said second terminal being connected to a common reference point, a rectifier having one end coupled to said first terminal, means coupling a first voltage between the other end of said rectifier and a common reference point, an impedance element having one end coupled to said first terminal, means coupling a second voltage between the other end of said impedance means and said common reference point, and control means having one end coupled to said first terminal and the other end coupled to said common reference point, said control means being controlled by an applied signal.

11. An electroluminescent device comprising an electroluminescent cell having first and second terminals, first and second rectifiers coupled to said first and second terminals respectively, means adapted for coupling an alternating voltage source between said first and second rectifiers, means adapted for coupling first and second direct voltage sources to opposite terminals of said first and second rectifiers, the magnitudes of said first and second direct voltages being such as to render said rectifiers conductive, and control means coupled to said first and second terminals, said control means selectively reversing the polarity of the voltage across said rectifiers thereby rendering them non-conductive.

References Cited in the file of this patent

UNITED STATES PATENTS

| | | |
|---|---|---|
| 2,136,441 | Karolus | Nov. 15, 1938 |
| 2,774,813 | Livingston | Dec. 18, 1956 |
| 2,856,558 | Cola | Oct. 14, 1958 |
| 2,866,922 | Matarese | Dec. 30, 1958 |